United States Patent
Sekiguchi et al.

(10) Patent No.: US 7,526,027 B2
(45) Date of Patent: Apr. 28, 2009

(54) VIDEO DATA CONVERTER AND VIDEO DATA CONVERTING METHOD

(75) Inventors: Shunichi Sekiguchi, Tokyo (JP); Yoshihisa Yamada, Tokyo (JP); Fuminobu Ogawa, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1008 days.

(21) Appl. No.: 10/501,897

(22) PCT Filed: Apr. 9, 2003

(86) PCT No.: PCT/JP03/04529

§ 371 (c)(1), (2), (4) Date: Jul. 20, 2004

(87) PCT Pub. No.: WO03/088676

PCT Pub. Date: Oct. 23, 2003

(65) Prior Publication Data

US 2005/0041740 A1  Feb. 24, 2005

(30) Foreign Application Priority Data

Apr. 16, 2002 (JP) .............................. 2002-112860

(51) Int. Cl.
*H04N 7/18* (2006.01)
(52) U.S. Cl. .............................. 375/240.16; 375/240.17
(58) Field of Classification Search ................................ 375/240.11–240.27
See application file for complete search history.

(56) References Cited

U.S. PATENT DOCUMENTS

| 6,058,143 A | * | 5/2000 | Golin | 375/240.16 |
| 6,081,295 A | * | 6/2000 | Adolph et al. | 375/240.03 |
| 6,647,061 B1 | * | 11/2003 | Panusopone et al. | 375/240.12 |

FOREIGN PATENT DOCUMENTS

| EP | 1 010 330 B1 | 1/2002 |
| JP | 6-105299 A | 4/1994 |
| JP | 7-264597 A | 10/1995 |
| JP | 8-18976 A | 1/1996 |
| JP | 8-130743 A | 5/1996 |
| JP | 9-322173 A | 12/1997 |
| JP | 9-322176 A | 12/1997 |
| JP | 10-112865 A | 4/1998 |
| JP | 10-191350 A | 7/1998 |
| JP | 10-336672 A | 12/1998 |
| JP | 11-243551 A | 9/1999 |
| JP | 2000-312363 A | 11/2000 |
| JP | 2001-268579 A | 9/2001 |
| JP | 2001-525638 A | 12/2001 |
| JP | 2002-10267 A | 2/2002 |
| KR | 2001-0031222 A | 4/2001 |

OTHER PUBLICATIONS

"Adaptive Motion-Vector Resampling for Compressed Video Downscaling," B. Shen et al., IEEE Transactions on Circuits and Systems for Video Technology, vol. 9, No. 6, pp. 929-936, Sep. 1999.
"Video Coding for Low Bit Rate Communication," ITU-T Recommendation H. 263, Feb. 1998.
"MPEG-2 to MPEG-4 Transcoding," W. X. Guo et al., Workshop and Exhibition on MPEG-4 (WEMP), 2001.
"Compressed Domain Motion Vector Resampling for Downscaling of MPEG Video," M.R. Hashemi et al., IEEE International Conference on Image Processing, Kobe, Japan, Oct. 1999, p. 276.
"Field-to-Frame Transcoding with Spatial and Temporal Downsampling," S. J. Wee et al., IEEE International Conference on Image Processing, Kobe, Japan, Oct. 1999.
"Rate-Distortion Optimization for Video Compression," G.J. Sullivan et al., IEEE Signal Processing Magazine, vol. 15, No. 6, pp. 74-90, Nov. 1998.

* cited by examiner

*Primary Examiner*—Andy S Rao
(74) *Attorney, Agent, or Firm*—Birch, Stewart, Kolasch & Birch, LLP

(57) ABSTRACT

In an MPEG-2 decoder (2), a variable length decoder (2A) carries out syntax analysis of input compression data (1) according to the MPEG-2 standard, and generates coding mode information (3), motion vector information (4) and prediction residual signal (2B). The prediction residual signal (2B) is transformed to a decoded picture (5) through a dequantizer (2C) and the like, and is supplied to an MPEG-4 encoder (10) via a resolution converter (6). In the MPEG-4 encoder (10), a coding parameter deciding section (10B) decides a motion vector according to a prediction error estimation value for evaluating a prediction efficiency when using a motion vector candidate generated by a motion vector mapping section (7), and according to a value for evaluating a motion vector rate when using the motion vector candidate.

18 Claims, 8 Drawing Sheets

FRAME PREDICTION

FIELD PREDICTION

DUAL-PRIME PREDICTION

FIELD PREDICTION

16×8 PREDICTION

DUAL-PRIME PREDICTION

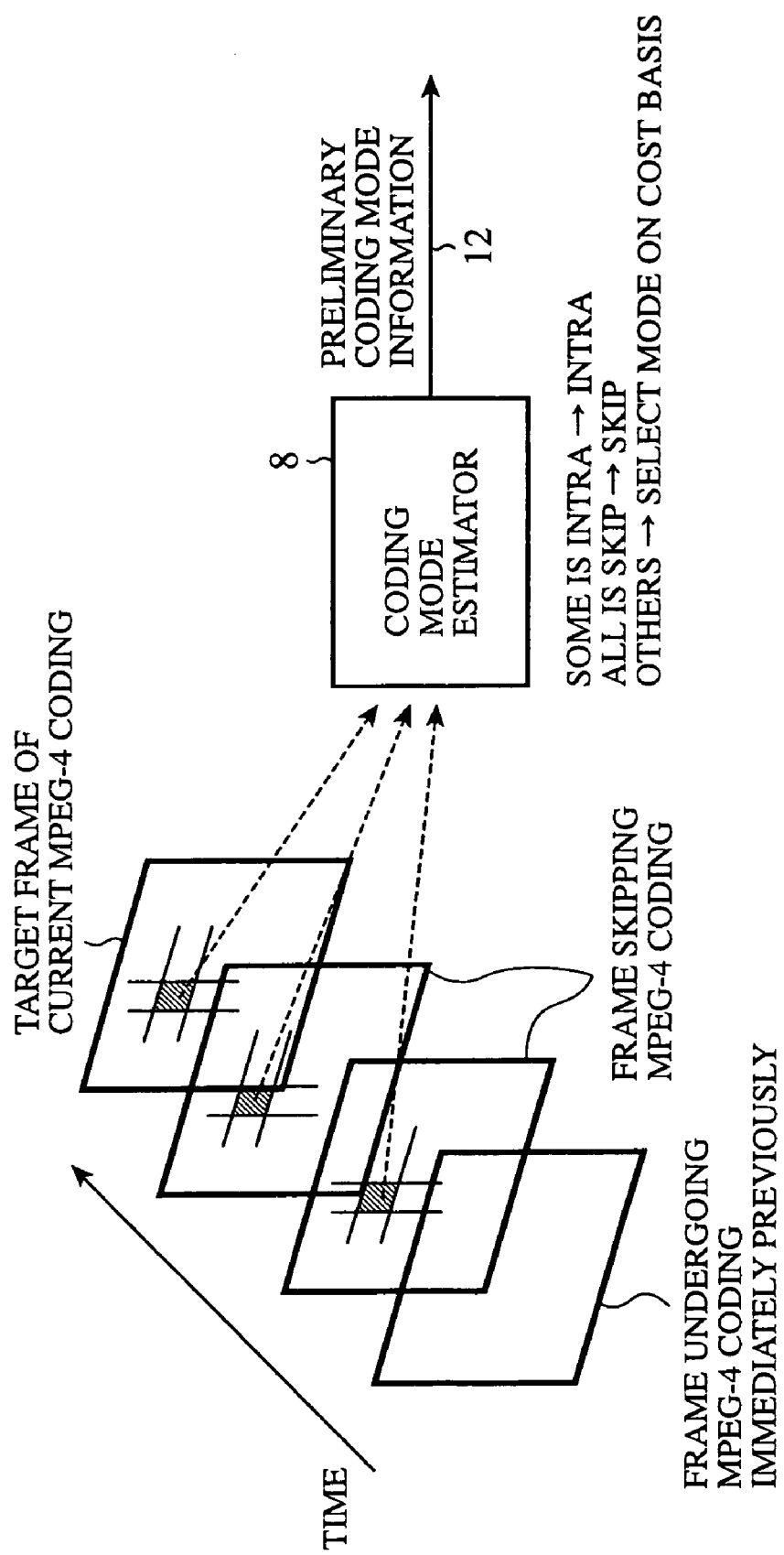

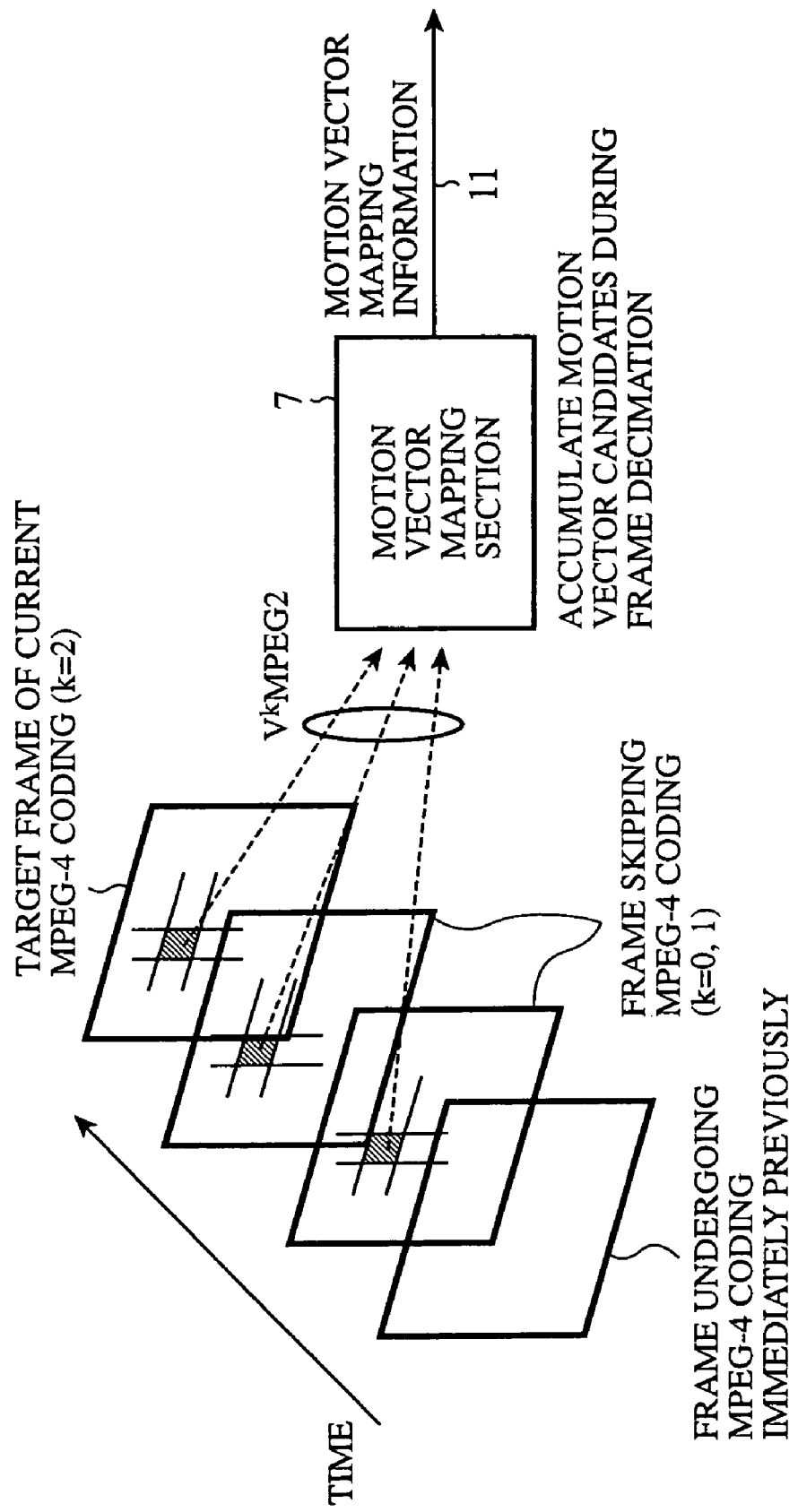

VIDEO DATA CONVERTER AND VIDEO DATA CONVERTING METHOD

TECHNICAL FIELD

The present invention relates to a video data converter and video data converting method for carrying out various conversions of video compression data conforming to video compression-decompression schemes of a variety of international standards.

BACKGROUND ART

At present, international standard video coding schemes such as MPEG and ITU-T H.26x are utilized in a variety of applications in the fields of broadcasting, communications and packages such as digital broadcasting (satellite, terrestrial, cable), DVDs, video CDs, the Internet and mobile communications.

The need is growing for reusing video contents compressed by these coding schemes in a variety of platforms under conditions different in supporting coding schemes, transmission bit rates, spatial resolutions (frame sizes), temporal resolutions (frame rates). With this as a background, intensive research and development of video transcoding technology has been conducted.

In particular, the standard video coding schemes such as MPEG and ITU-T H.26x share the syntax of the coded data to some extent because they are consistently based on the signal redundancy reduction in the time-axis direction according to motion compensation (called MC from now on) and the signal redundancy reduction in the spatial direction according to discrete cosine transform (called DCT from now on). Considering conversions using them at a bit stream level, the transcoding technology that reduces computational load has been studied as to the standard video coding schemes.

Above all, converting MPEG-2 videos with an NTSC resolution (704×480 pixels per frame and 30 frames/sec) to lower frame rate MPEG-4 or H.263 videos with an SIF (352×240 pixels) becomes a hot topic because of an increasing demand for making effective use of existing MPEG-2 contents (refer to Wang Xing Guo, Zheng Wei Guo, and Ishfaq Ahmad, "MPEG-2 To MPEG-4 Transcoding", Workshop and Exhibition on MPEG-4 (WEMP) 2001, for example).

In such video transcoding technology, it is important to convert motion vectors in an MPEG-2 video stream input to a transcoder into motion vectors usable in the MPEG-4 coding.

Since divide-by-two resolution conversion is made in both the vertical and horizontal directions, four macroblocks in an input MPEG-2 stream exactly correspond to one macroblock of the MPEG-4 coding. The problem is a one that estimates a motion vector after the resolution conversion from four original motion vectors at the maximum, and a variety of studies and reports have been made about it up to now. For example, B. Shen et al., "Adaptive Motion-Vector Resampling for Compressed Video Downsampling", IEEE Transactions on Circuits And Systems for Video Technology, vol. 9, no. 6, September 1999 discloses a technique of calculating the weighted average of the four motion vectors by assigning larger weights to motion vectors with a larger prediction residue in the input compression data.

It is so to speak a method of deciding the values of the motion vectors to be converted by using the prediction residual signal in the input compression data as a reference and in accordance with its activity values. A variation of this method is reported by M. R. Hashemi, et al., "Compressed Domain Motion Vector Resampling for Downscaling of MPEG Video", IEEE International Conference on Image Processing, Kobe, Japan, October 1999.

With the foregoing configuration, the conventional video data converting method has problems in that its application is limited to a case where the motion vector to be converted is only one, and that it does not ensure the optimum conditions in terms of coding performance of the motion vector after the conversion.

The present invention is implemented to solve the foregoing problems. Therefore it is an object of the present invention to provide a video data converter and video data converting method capable of converting motion vectors considering the impact of the coding performance within a second video coding scheme.

DISCLOSURE OF THE INVENTION

According to an aspect of the present invention, there is provided a video data converter for converting input video coded data based on a first video coding scheme to video coded data based on a second video coding scheme, the first video coding scheme carrying out coding by dividing each frame of a video signal into specified segments and by selecting coding parameters including a motion vector for each specified segment, and the second video coding scheme carrying out coding by dividing each frame of the video signal into specified segments and by selecting coding parameters for each specified segment, the video data converter comprising: a motion vector mapping section for generating a motion vector candidate to be used for each specified segment of the second video coding scheme from the motion vector in the coding parameters of each specified segment of the first video coding scheme; and a coding parameter deciding section for deciding a motion vector to be used in the second video coding scheme from among the generated motion vector candidates in the second video coding scheme according to a prediction error estimation value that estimates a prediction efficiency when using the motion vector candidates and according to a value that estimates a motion vector rate when using the motion vector candidates.

Thus, it offers an advantage of being able to covert the motion vectors and the like considering impact of coding performance in the second video coding scheme.

BRIEF DESCRIPTION OF THE DRAWINGS

FIG. 7 is a diagram illustrating a monitoring operation of the MPEG-2 coding mode by a coding mode estimator 8; and FIG. 8 is a diagram illustrating a monitoring operation of MPEG-2 motion vectors by a motion vector mapping section 7.

BEST MODE FOR CARRYING OUT THE INVENTION

The best mode for carrying out the invention will now be described with reference to the accompanying drawings to explain the present invention in more detail.

Embodiment 1

The present embodiment 1 will be described by way of example of a video transcoder that inputs MPEG-2 video data and outputs MPEG-4 video data whose spatial resolution is downsampled-by-two in the vertical and horizontal directions. The following description is made under the assumption that the MPEG-4 is a coding scheme conforming to the MPEG-4 simple profile.

Figure 1:
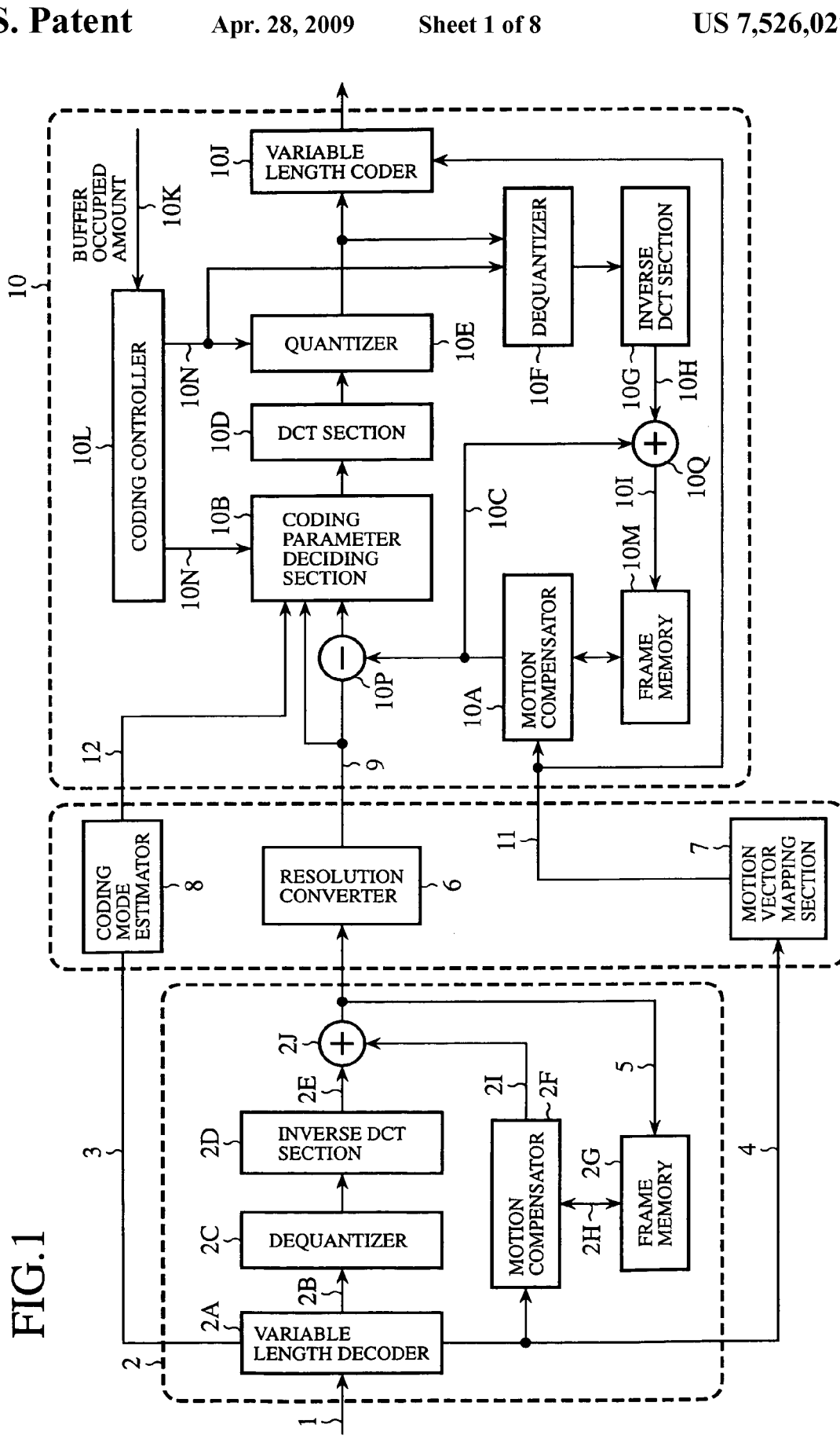
FIG. 1 is a block diagram showing a configuration of a video transcoder (video data converter) of an embodiment 1 in accordance with the present invention.

FIG. 1 is a block diagram showing a configuration of a video transcoder (video data converter) of an embodiment 1 in accordance with the present invention. In FIG. 1, an MPEG-2 decoder 2 receives input compression data 1 compressed according to a coding scheme conforming to MPEG-2, and generates a decoded picture 5 from the input compression data 1. A variable length decoder 2A carries out syntax analysis of the input compression data 1 according to the MPEG-2 standard, and generates prediction residual signal coded data 2B, coding mode information 3 and motion vector information 4. A dequantizer 2C dequantizes the prediction residual signal coded data 2B generated by the variable length decoder 2A. An inverse DCT section 2D carries out the inverse DCT of the prediction residual signal coded data after the dequantization, and outputs prediction residual signal decoded values 2E.

A motion compensator 2F generates a predictive picture 2I according to the motion vector information 4 generated by the variable length decoder 2A and reference picture data 2H stored in a frame memory 2G. An adder 2J adds the prediction residual signal decoded values 2E output from the inverse DCT section 2D and the predictive picture 2I generated by the motion compensator 2F, and generates a decoded picture 5. The frame memory 2G stores the decoded picture 5 as the reference picture data 2H.

A resolution converter 6 converts the resolution of the decoded picture 5 generated by the MPEG-2 decoder 2 by downscaling pixel areas by two in the vertical and horizontal directions. The motion vector mapping section 7 generates motion vector mapping information 11 (a candidate of the motion vector) that can be used by the MPEG-4 coding from the motion vector information 4 generated by the variable length decoder 2A. The coding mode estimator 8 decides coding mode setting information 12 to be used by the MPEG-4 coding from the coding mode information 3 generated by the variable length decoder 2A.

According to MPEG-4, an MPEG-4 encoder 10 encodes the decoded picture 9 whose resolution is converted by the resolution converter 6. A motion compensator 10A generates a predictive picture 10C in accordance with the motion vector mapping information 11 and reference picture data stored in a frame memory 10M. A subtracter 10P generates a prediction residual signal by calculating a difference between the input signal 9 (that is, the decoded picture whose resolution is converted by the resolution converter 6) and the predictive picture 10C generated by the motion compensator 10A. A coding parameter deciding section 10B decides the coding mode and motion vector used for the coding on a macroblock by macroblock basis of the MPEG-4 according to the coding mode setting information 12 and the like.

A DCT section 10D carries out the DCT of the prediction residual signal generated by the subtracter 10P when the coding mode decided by the coding parameter deciding section 10B is either an INTER mode or an INTER4V mode, and performs the DCT of the input signal 9 when the coding mode is an INTRA mode. A quantizer 10E quantizes the output signal of the DCT section 10D. A dequantizer 10F dequantizes the output signal of the quantizer 10E. An inverse DCT section 10G carries out the inverse DCT of the output signal of the dequantizer 10F, and outputs prediction residual signal decoded values 10H. An adder 10Q adds the prediction residual signal decoded values 10H output from the inverse DCT section 10G and the predictive picture 10C generated by the motion compensator 10A. The addition result 10I is stored in a frame memory 10M to be used for the MC of a subsequent frame.

A variable length coder 10J arranges the output signal of the quantizer 10E in a format of the MPEG-4 video stream. A coding controller 10L controls the coding parameter deciding section 10B, quantizer 10E, dequantizer 10F and the like.

Next, the operation will be described.

① Decoding of Input MPEG-2 Video Stream

First, the input compression data 1 compressed according to the MPEG-2 compliant coding scheme is input to the MPEG-2 decoder 2.

The variable length decoder 2A of the MPEG-2 decoder 2 carries out the syntax analysis of the input compression data 1 according to the MPEG-2 standard, and generates the prediction residual signal coded data 2B, coding mode information 3 and motion vector information 4.

The dequantizer 2C, receiving the prediction residual signal coded data 2B from the variable length decoder 2A, dequantizes the prediction residual signal coded data 2B.

Receiving the prediction residual signal coded data after the dequantization from the dequantizer 2C, the inverse DCT section 2D carries out the inverse DCT of the prediction residual signal coded data, and outputs the prediction residual signal decoded values 2E.

The motion compensator 2F receives the motion vector information 4 from the variable length decoder 2A, and generates the predictive picture 2I in accordance with the motion vector information 4 and the reference picture data 2H stored in the frame memory 2G. Here, the motion vector information 4 is assumed to include all the information on the MC such as a flag indicating whether the frame prediction or field prediction is to be done, besides motion vector values.

When the motion compensator 2F generates the predictive picture 2I, the adder 2J generates the decoded picture 5 by adding the predictive picture 2I and the prediction residual signal decoded values 2E output from the inverse DCT section 2D. Here, the decoded picture 5 is stored in the frame memory 2G as the reference picture data 2H to be used for the subsequent frame motion compensation.

② Resolution Conversion

The MPEG-2 decoded picture 5 generated by the MPEG-2 decoder 2 is input to the resolution converter 6 serving as a spatial resolution converter.

The resolution converter 6 carries out pixel decimation based on a specified downsampling filter to reduce the resolution of the MPEG-2 decoded picture 5 to half the spatial resolution in the vertical and horizontal directions, for example. The result is the input signal 9 to the MPEG-4 encoder 10.

As for the resolution conversion in the time-axis direction, S. J. Wee, et al., "Field-to-frame Transcoding with Spatial And Temporal Downsampling", IEEE International Conference on Image Processing, Kobe, Japan, October 1999, for example, discloses a relevant technique. It allows, when the MPEG-2 stream includes B frames (Bidirectionally predictive frames), only a processing of reducing the frame rate by decimating the B frames. This is because unlike I (Intra) or P (Unidirectionally Predictive) frames, the B frames themselves are not used to predict other frames, and hence the decimation of the B frames does not affect the quality of the other frames.

For example, as for a widely used coding pattern that inserts two B frames between I (Intra) or P (Unidirectionally Predictive) frames, decimation of all the B frames can reduce the frame rate to ⅓. In the present embodiment 1, it is assumed that MPEG-2 I (Intra) frames remain as MPEG-4 I (Intra) frames, and that MPEG-2 P (Unidirectionally Predictive) frames remain as MPEG-4 P (Unidirectionally Predictive) frames after the conversion.

③ Motion Vector Mapping and Coding Mode Selection

Now, the motion vector mapping and coding mode selection, the subject matter of the present invention, will be described. The process is carried out by the motion vector mapping section 7, the coding mode estimator 8, and the coding parameter deciding section 10B of the MPEG-4 encoder 10 in FIG. 1.

Figure 2:
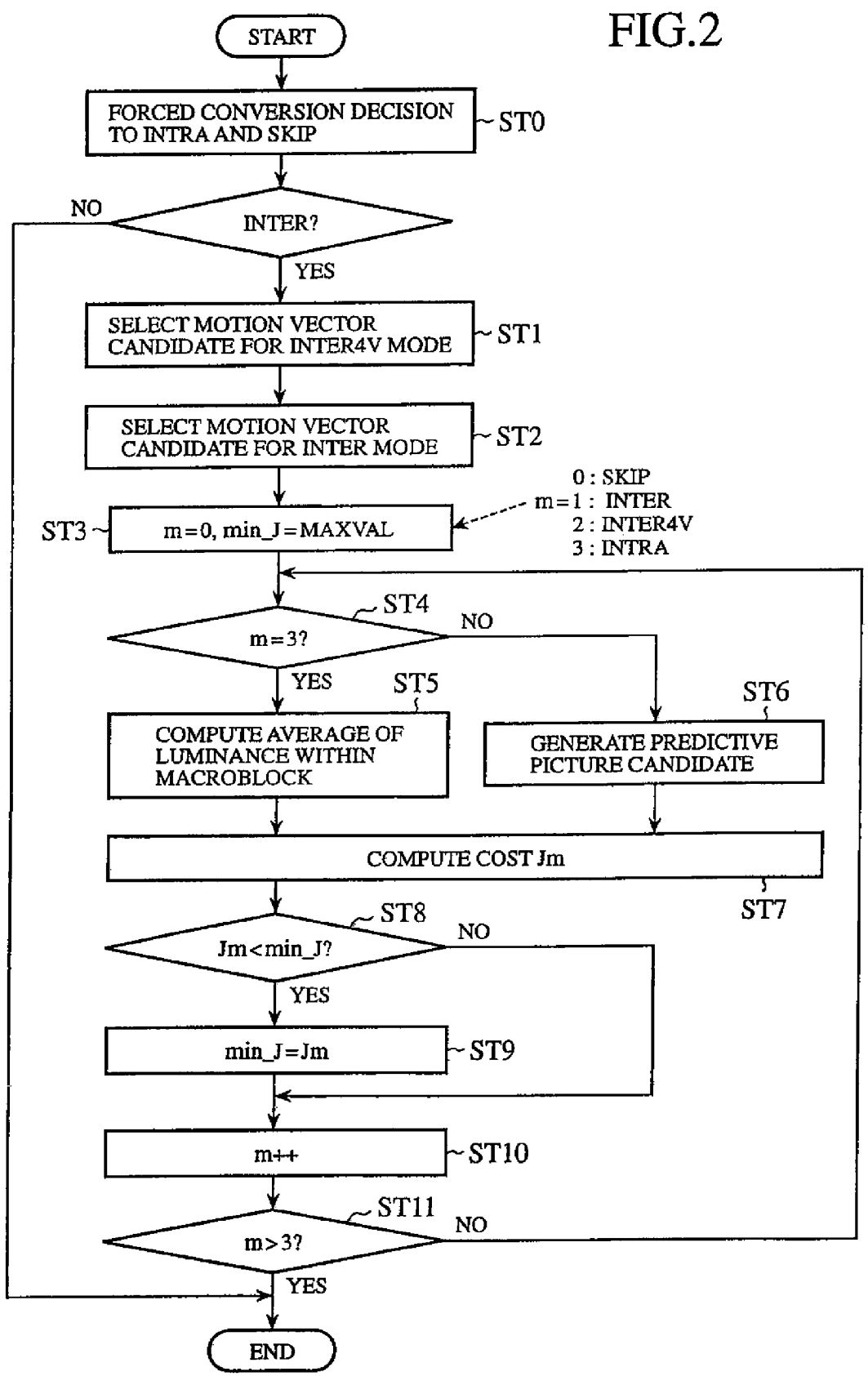
FIG. 2 is a flowchart illustrating a procedure of a motion vector mapping and coding mode decision in the video transcoder.

FIG. 2 is a flowchart illustrating a procedure of the motion vector mapping and coding mode decision by the video transcoder.

Figure 3A:
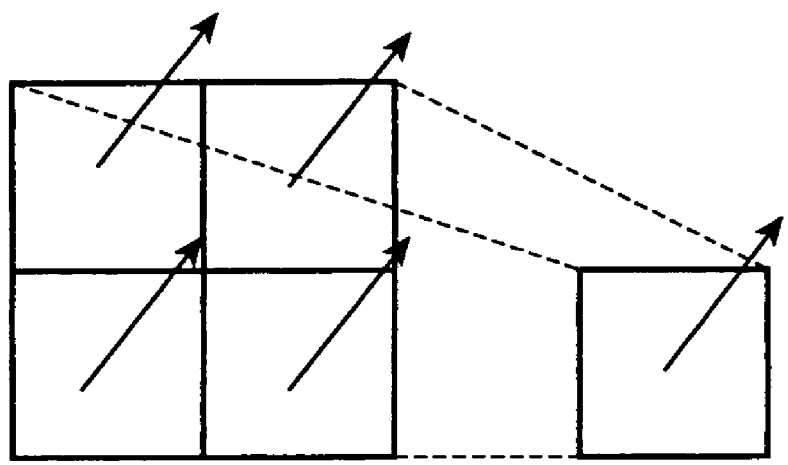
FIGS. 3A and 3B are diagrams each illustrating a unit of transcoding accompanying resolution conversion.
Figure 3B:
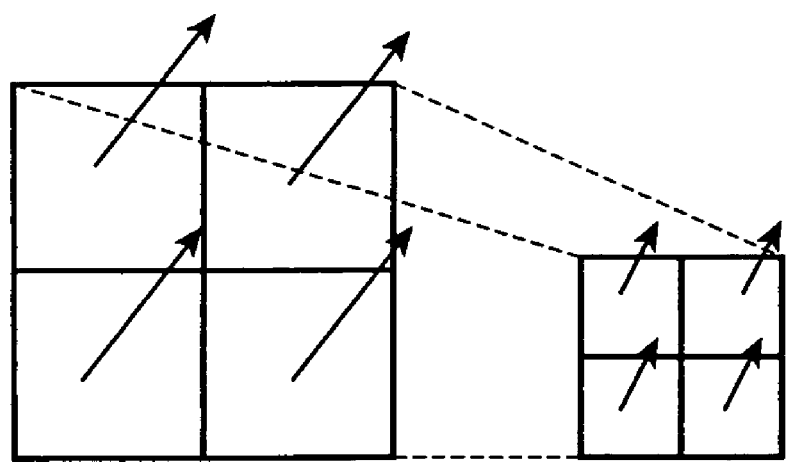

The MPEG-2 decoded picture 5 and the input signal 9 to the MPEG-4 encoder 10 have half the spatial resolution in the vertical and horizontal directions. Accordingly, the following procedure is assumed to be carried out on a 2×2 macroblock basis of MPEG-2, that is, on a single macroblock basis of MPEG-4. FIGS. 3A and 3B are diagrams each illustrating a unit of transcoding involving the resolution conversion.

In MPEG-4, one or four motion vectors are assigned to a macroblock, thereby providing two motion vector mapping methods as shown in FIGS. 3A and 3B: In FIG. 3A, four MPEG-2 motion vectors are converted to one MPEG-4 motion vector; and in FIG. 3B, four MPEG-2 motion vectors are converted to four MPEG-4 motion vectors.

1) Preliminary Forced Coding Mode Decision (step ST0)

First, the coding mode estimator 8 checks on the coding mode distribution in 2×2 macroblocks of MPEG-2 as shown in FIGS. 3A and 3B. When all the four macroblocks are in the INTRA mode or in the SKIP mode, the coding mode after the conversion to be used by the MPEG-4 coding are forcedly put into INTRA or SKIP. In this case, all the motion vectors are placed at zero, and all the following steps are skipped.

Here, the INTRA mode is a mode of coding within each frame without using the motion prediction, and the SKIP mode is a mode of copying the picture data at the same position in the reference picture without transmitting the coding information.

Consequently, employing the INTER mode that carries out the motion prediction by using the motion vectors, only when at least one of the four macroblocks has the motion prediction mode, can increase the coding efficiency. In this case, however, the optimum mode in terms of the coding efficiency must be redecided among the possible MPEG-4 coding modes according to the following procedure 2) and onward.

Thus, the coding mode setting information 12 output from the coding mode estimator 8 includes three possible choices of forced INTRA mode, forced SKIP mode, and possible INTER mode.

2) Selection of Motion Vector Candidates

When a decision is made at the foregoing section 1) that the INTER mode is valuable, the motion vector candidates used by the MPEG-4 encoder 10 are determined from the MPEG-2 motion vectors in the 2×2 macroblocks output from the variable length decoder 2A of the MPEG-2 decoder 2.

The process is carried out by the motion vector mapping section 7.

MPEG-2, which supports compression coding of an interlace signal, can select one of two coding modes: frame structure coding using a frame as a unit of coding; and field structure coding using a field as a unit of coding.

In the frame structure coding, a macroblock consisting of 16×16 pixels is composed of a frame picture segment, and in the field structure coding, the macroblock is composed of a field picture segment. The frame is defined as picture data consisting of a top field (field composed of upper lines) and a bottom field (field composed of lower lines) combined in comb fashion. Accordingly, a macroblock in the field structure coding covers twice the area in the vertical direction compared with a macroblock in the frame picture segment.

Figure 4A:
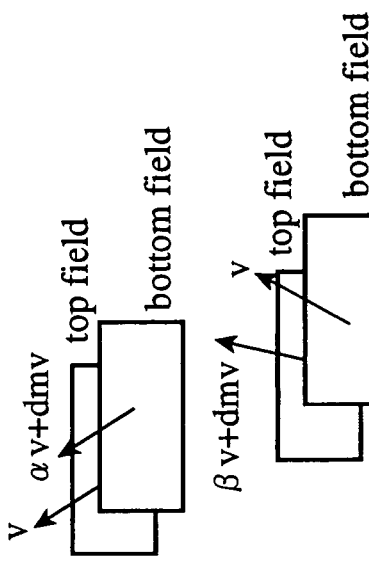
FIGS. 4A and 4B are diagrams illustrating types of motion prediction modes in MPEG-2 video coding.
Figure 4B:
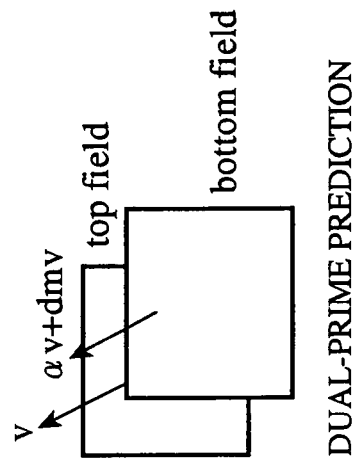
Figure 4B:
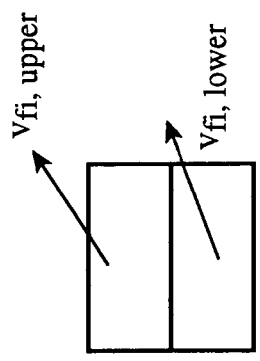

FIGS. 4A and 4B are diagrams each illustrating a type of a motion prediction mode in the MPEG-2 video coding.

FIG. 4A illustrates a motion prediction mode usable for the frame structure coding, and FIG. 4B illustrates a motion prediction mode usable for the field structure coding. In FIG. 4A, the frame prediction predicts a macroblock consisting of a frame picture by a single motion vector $v_{fr}$. In contrast, the field prediction makes a prediction for individual field segments of the macroblock consisting of the frame picture by separate motion vectors $v_{tf}$ and $v_{bf}$.

In this case, it can select one of the top field and bottom field as the field to be referred to. As for dual-prime prediction, it generates a first predictive picture from the same field position with a single field vector v (the top field prediction refers to the top field, and the bottom field prediction refers to the bottom field). In addition, from the different field position, it generates a second predictive picture with a motion vector obtained by adding a small differential motion vector dmv to a result obtained by scaling the vector v based on the interfield distance. Then it uses the arithmetic mean of the first and second predictive pictures as the predictive picture of each field.

In FIG. 4B, the field prediction predicts a macroblock composed of a field picture with a single motion vector $v_{fi}$. The 16×8 prediction is made by dividing the macroblock composed of the field picture into two segments of upper and lower 16×8 segments, and by making prediction with individual motion vectors $v_{fi,upper}$ and $v_{fi,lower}$. As for the dual-prime prediction, the prediction is made by applying the same rule as in the frame structure coding to the field.

In response to the MPEG-2 motion prediction mode, the motion vector mapping section 7 generates the motion vectors for the MPEG-4 coding. The present embodiment 1 selects the motion vectors used for the MPEG-4 coding in the following procedure.

2-1) Selection of Motion Vector Candidates for INTER4V Mode (step ST1)

The motion vector defined for each MPEG-2 macroblock is downscaled to the motion vector after the resolution conversion in accordance with the characteristics of the prediction. Then, the four motion vectors corresponding to the 2×2 macroblocks of MPEG-2 are determined uniquely, and are made motion vector candidates for the MPEG-4 INTER4V mode.

The INTER4V mode refers to a mode corresponding to the case of FIG. 3B, which divides the 16×16 pixel macroblock defined in the frame picture segment into four 8×8 pixel blocks, and makes the prediction with the individual motion vectors of the blocks. The present step ST1 selects the motion vector candidates for the INTER4V mode according to the following rules.

A) In the Case of Frame Structure Coding.

[Frame Prediction]

A motion vector candidate is generated by halving the motion vector $v_{fr}$ in the horizontal direction and vertical direction.

[Field Prediction]

A motion vector candidate is generated by halving the motion vector $v_{tf}$ of the top field in the horizontal direction.

[Dual-Prime Prediction]

A motion vector candidate is generated by halving the average value of the motion vector v for the top field and αv+dmv in the horizontal direction.

B) In the Case of Field Structure Coding

Only the vector used for the prediction of the top field is extracted in the following.

[Field Prediction]

A motion vector candidate is generated by halving the motion vector $v_{fi}$ in the horizontal direction and by quartering it in the vertical direction.

[16×8 Prediction]

A motion vector candidate is generated by averaging the motion vectors $v_{fi,upper}$ and $v_{fi,lower}$, and then by halving the average in the horizontal direction and vertical direction.

[Dual-Prime Prediction]

A motion vector candidate is generated by halving the average of the motion vector v and αv+dmv in the horizontal direction and by quartering it in the vertical direction.

2-2) Selection of Motion Vector Candidates for INTER Mode (step ST2)

From the four motion vectors determined above, the motion vector for the MPEG-4 INTER mode is decided. The INTER mode refers to a mode corresponding to the case of FIG. 3A, which predicts a macroblock composed of 16×16 pixels defined in the frame picture segment with a single motion vector.

It can be decided by the method disclosed by B. Shen, et al., "Adaptive Motion-Vector Resampling for Compressed Video Downsampling", IEEE Transactions on Circuits And Systems for Video Technology, vol. 9, no. 6, September 1999.

The motion vector candidates for the INTER and INTER4V modes, which are selected in the foregoing sections 2-1) and 2-2), are supplied to the MPEG-4 encoder 10 as the motion vector mapping information 11.

3) Coding Mode Decision

In the foregoing section 2), the motion vector candidates to be used by the MPEG-4 INTER and INTER4V modes are selected. Then, from among these modes and the remaining possible coding modes, INTRA mode and SKIP mode, the mode with the highest coding efficiency is selected. As a result, the final coding mode and motion vectors are decided. The processing is carried out by the coding parameter deciding section 10B.

The mode decision uses the rate-distortion cost $J_m$ given by the following equation as a decision reference.

$$(m^*, v_m^*) = \arg \min_{m \in M} J_m$$

$$J_m = \alpha_m E_m + \lambda R_{vm}$$

where m is a coding mode type, $v_m$ is a motion vector in the mode m, M is a set of the mode types (M=(INTRA, SKIP, INTER, INTER4V)), $\alpha_m$ is a constant determined in accordance with the mode m, $E_m$ is a prediction error estimation value in the mode m, $R_{vm}$ is a motion vector rate when the motion vector is $v_m$, $\lambda$ is a positive constant, and $m^*$ and $v_m^*$ are the coding mode and motion vectors selected as a result of the present estimation. Incidentally, the coding mode decision of the present section 3) can be made on the basis of either the prediction error estimation value or the motion vector rate.

The prediction error estimation value $E_m$ associated with the SKIP, INTER or INTER4V mode can be defined, for example, as the sum of absolute values of the differences between the input signal 9 and the predictive picture candidates obtained from the motion compensator 10A using the motion vectors $v_m$. It is assumed here that the motion vectors $v_m$ are zero and $R_{vm}$ are also zero in the case of SKIP. To evaluate the INTRA mode by the same estimation equation, the $E_m$ of the INTRA mode obtained as follows can be used. First, the average values of the luminance signal in the input signal 9 within the macroblocks are considered as the predictive picture candidates; second, the differences are obtained by subtracting the predictive picture candidates from the input signal 9; and third, the sum of the absolute values of differences is used as the $E_m$ of the INTRA mode. Incidentally, the $E_m$ can also be defined by considering not only the luminance signal, but also the color-difference components (Cb and Cr components).

Widely used color component sampling ratios of the target MPEG-2 and MPEG-4 video to be coded are Y:Cb:Cr=4:2:0 (when the Cb and Cr components in the 8×8 pixel area correspond to the luminance component in the 16×16 pixel area). Accordingly, as in the case of the luminance component of the foregoing INTRA mode, it is possible to consider the average values (DC components) of the 8×8 segment of the Cb and Cr components as the predictive picture candidates, and to take into consideration the sum of the absolute values of the differences obtained by subtracting the average values from the Cb and Cr components of the input signal 9. This makes it possible to estimate the motion vectors considering not only the degree of similarity between the luminance patterns, but also the degree of similarity between colors, thereby being able to prevent the degradation due to color deviation conspicuous to visual perception.

In the INTRA mode, although the motion vector rate $R_{vm}$ is zero, the number of DCT coefficients to be coded are great. Thus, estimation weights for the $E_m$ are varied in advance by the weights $\alpha_m$. This makes it possible to make the mode decision by simulatively considering the addition of the DCT coefficient rate in the INTRA mode.

The estimation weighting for the $E_m$ can be carried out by adding offset values $O_m$ rather than by multiplying the weights $\alpha_m$.

As the value $\lambda$, the following value can be used which is disclosed in Gary J. Sullivan and Thomas Wiegand, "Rate- Distortion Optimization for Video Compression", IEEE Signal Processing Magazine, vol. 15, no. 6, pp. 74-90, November 1998.

$$\lambda = \sqrt{0.85 * Q_P^2}$$

where Qp is a quantization step parameter of the target macroblocks to be coded.

In FIG. 2, m is defined as a counter for convenience' sake, and the foregoing process is described in the form of a loop processing of m. If a decision is made that the INTER mode is worth estimation from the coding mode setting information 12 output from the coding mode estimator 8, the processing is started after initializing the m and cost estimate min_J (step ST3).

After a decision is made as to whether m=3 (INTRA) or not (step ST4), the average value of the luminance value within the macroblock is computed in the case of INTRA (step ST5). Otherwise, the predictive picture candidate is generated by the motion compensator 10B using the motion vectors $v_m$ determined from the motion vector mapping information 11 (step ST6). As for the results at step ST5 or step ST6, the sum is computed of the absolute values of the differences between the results and the luminance signal of the target macroblock to be coded represented by the input signal 9, and the cost $J_m$ is computed by placing the sum as the $E_m$ (step ST7). At steps ST8 and ST9, the candidate update is carried out to the mode m that will minimize the cost. At step ST10, m is incremented, and the processing is continued until the loop is completed at step ST11.

If a decision is made that the INTER mode is valuable at step ST0 in the foregoing procedure, it is possible to select the optimum mode and the motion vectors associated with the mode from among all the possible coding modes in the MPEG-4 coding.

Although the conventional technology discloses the selection of the motion vector candidates as described in the foregoing section 1), it does not estimate the rate cost of the resultant motion vector itself, nor its impact on the MPEG-4 coding. In particular, although the motion vector rate cannot be neglected in the low rate MPEG-4 coding, using the foregoing decision norm makes it possible to select the candidate that will provide optimum tradeoff between the rate and prediction accuracy from the INTER and INTER4V motion vector candidates.

In addition, deciding the INTRA or SKIP by a similar estimation measure makes it possible to decide the motion vectors and coding mode to be used for the MPEG-4 coding at once using the same decision norm.

(D) MPEG-4 Encoding

As a result of the foregoing processing, the motion vector mapping information 11 and coding mode setting information 12, which are supplied to the MPEG-4 encoder 10 in such a manner as to reuse the motion vector information and coding mode information extracted from the input compression data 1, are used for coding the input signal 9, which is the MPEG-2 decoded picture after the resolution conversion. These two items of information are utilized by the coding parameter deciding section 10B to decide the coding mode and motion vectors that are used for coding on a macroblock by macroblock basis of MPEG-4.

As a result, in one of the INTER and INTER4V mode, the motion compensator 10A generates the predictive picture 10C, followed by generating the prediction residual signal by computing the differences between the predictive picture 10C and the input signal. The prediction residual signal passes through the DCT section 10D and quantizer 10E to be arranged in the MPEG-4 video stream by the variable length coder 10J.

In the INTRA mode, the input signal 9 itself passes through the DCT and quantization to undergo the variable length coding. In the SKIP mode, only the flag (not_coded) indicating that the macroblock is to be skipped is multiplexed to the bit stream to undergo the coding.

The prediction residual signal after the quantization passes through the dequantizer 10F and inverse DCT section 10G to be restored to the prediction residual signal decoded values 10H which are added to the predictive picture 10C. The addition results are stored in the frame memory 10M to be used for the MC for the subsequent frame.

Incidentally, the variable length coder 10J carries out within itself the prediction of the AC and DC components, and the scanning for the run-length coding of the DCT coefficients.

In addition, since the output of the variable length coder 10J is transmitted or recorded after being buffered, the coding controller 10L carries out the coding control in accordance with the buffer occupied amount 10K. Specifically, the coding controller 10L decides a quantization step parameter (Qp) 10N on a video packet or macroblock basis. The video packet is a unit constructed by grouping a plurality of macroblocks in the raster scanning sequence, and is used for early recovering from an error by cutting off a dependent relationship with the surrounding image segments within the frame. The quantization step parameter 10N thus decided is supplied to the quantizer 10E and dequantizer 10F, as well as to the coding parameter deciding section 10B to compute the value λ.

As described above, according to the present embodiment 1, the transcoder, which carries out the conversion from the MPEG-2 video data to the MPEG-4 video data, decides the optimum coding mode and motion vectors for the MPEG-4 coding with reusing the motion vectors and the coding mode information in the MPEG-2 data. Thus, it can improve the quality of the transcode video with a small amount of computation.

In particular, the present embodiment 1 simplifies the motion vector detection with a large computational load. Accordingly, it can improve the video transcoding quality from MPEG-2 to MPEG-4 as compared with the conventional simple motion vector reusing method.

Although not described in detail, the present configuration can further improve the coding efficiency by closely combining either the decision process of the quantization step parameter (Qp) 10N by the coding controller 10L or the setting unit such as a frame, video packet and macroblock, with the motion vector-coding mode information reuse scheme of MPEG-2 as described in the foregoing section ③.

Although the foregoing description is made by way of example of the MPEG-4 simple profile, the transcoder with the present configuration is applicable to all the MPEG-4 simple profile compliant multi-mode coding schemes such as an MPEG-4 advanced simple profile and a case supporting the motion prediction option described in Annex F in ITU-T H.263.

Embodiment 2

In the present embodiment 2, the resolution converter 6 operates not only as the spatial resolution converter, but also as a temporal resolution converter for carrying out the temporal resolution (frame rate) conversion by decimating the P frames to which the effect of the motion prediction is transmitted. The resolution converter 6 can function as both the spatial resolution converter and temporal resolution converter, or as the temporal resolution converter without functioning as the spatial resolution converter.

Figure 5:
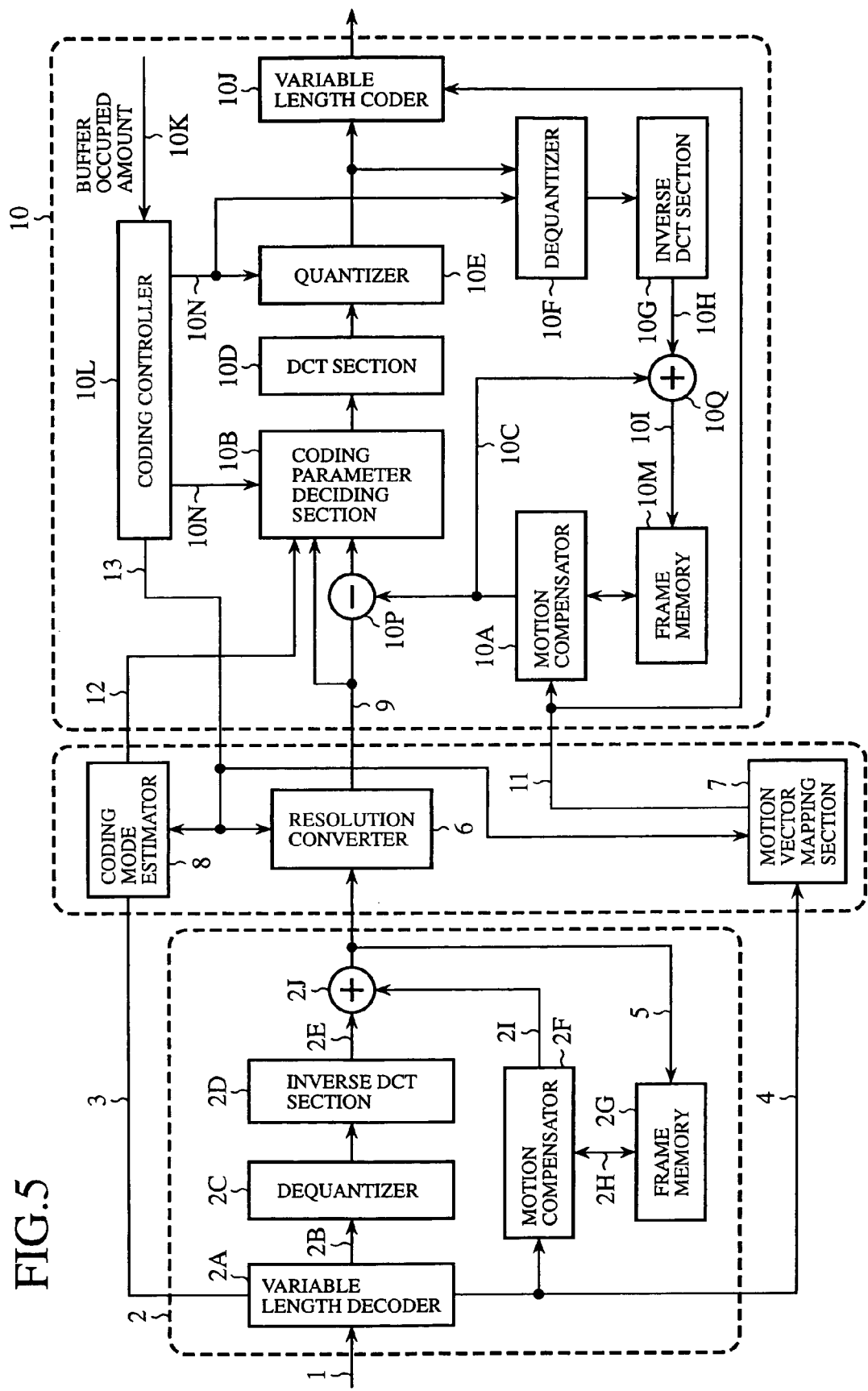
FIGS. 5 is a block diagram showing a configuration of a video transcoder (video data converter) of an embodiment 2 in accordance with the present invention.

FIG. 5 is a block diagram showing a configuration of a video transcoder (video data converter) of the embodiment 2 in accordance with the present invention. The configuration of the transcoder of the present embodiment 2 has the same internal configuration as the transcoder of the embodiment 1 as shown in FIG. 1. It differs from the foregoing embodiment 1 in the operation of the resolution converter 6 and motion vector mapping section 7, which will be described in detail here.

Next, the operation will be described.

① Decoding of Input MPEG-2 Video Stream

The decoding is the same as that of the foregoing embodiment 1.

② Resolution Conversion

The MPEG-2 decoded picture 5 is halved in the spatial resolution in the vertical and horizontal directions by the pixel decimation based on a specified downsampling filter in the resolution converter 6. In addition, according to coding frame instruction information 13 sent from the MPEG-4 encoder 10, the input frame rate of the input signal 9 to the MPEG-4 encoder 10 is controlled.

The present embodiment 2 is configured such that it carries out not only the decimation of the B frames as described in the foregoing embodiment 1, but also the decimation of the P frames according to the instruction of the coding frame instruction information 13.

The coding frame instruction information 13 indicates the coding frame rate when the MPEG-4 encoder 10 carries out the coding at a fixed frame rate. In contrast, when the MPEG-4 encoder 10 carries out the coding at a variable frame rate, the coding frame instruction information 13 indicates information on the display timing of the target frame to be coded, or information on a frame number offset from the immediately previous MPEG-4 coding frame.

③ Motion Vector Mapping and Coding Mode Selection

Next, the motion vector mapping and coding mode selection, the subject matter of the present embodiment 2, will be described.

The process is carried out by the motion vector mapping section 7, coding mode estimator 8, and coding parameter deciding section 10B in the MPEG-4 encoder 10 as shown in FIG. 5.

Figure 6:
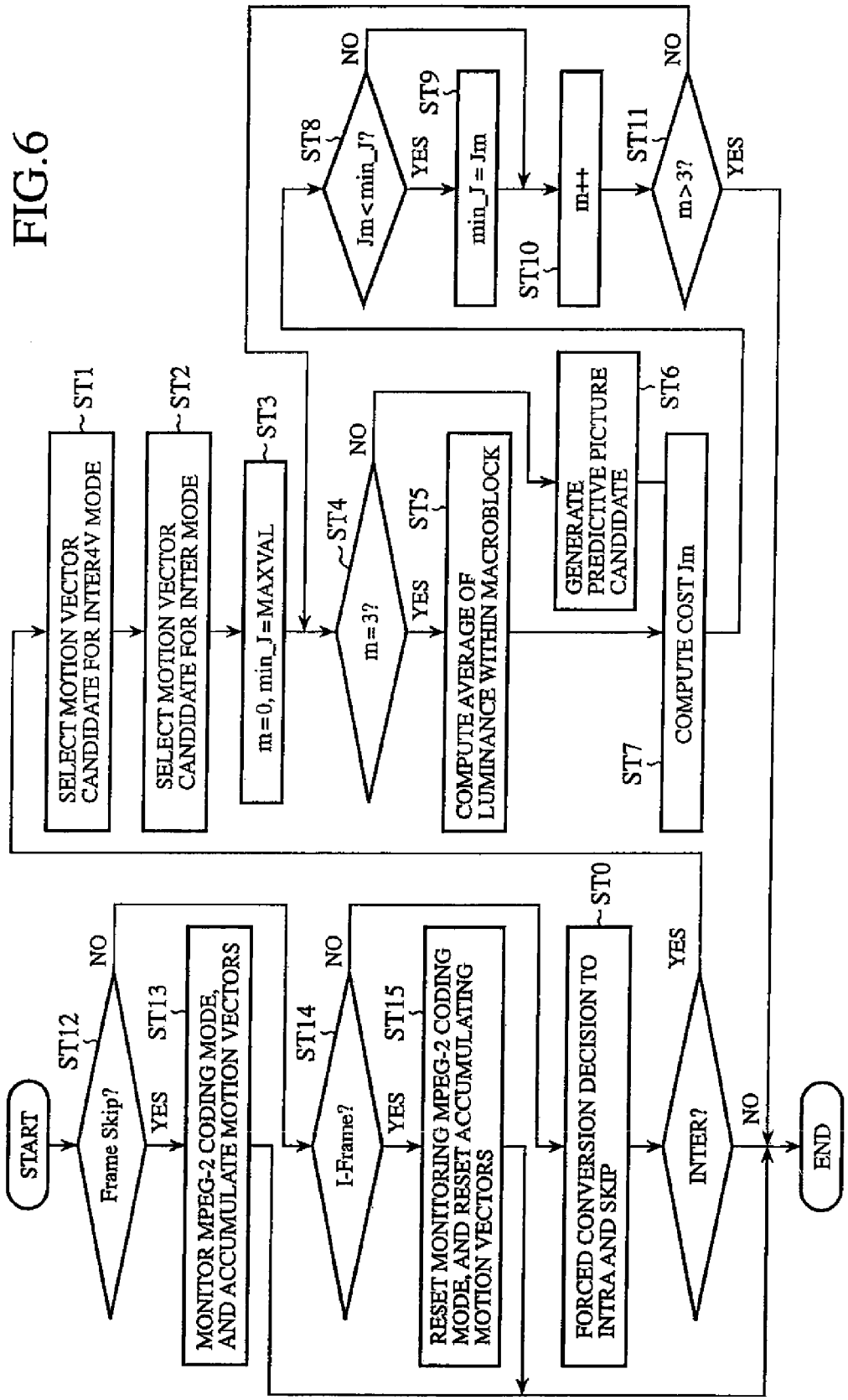
FIG. 6 is a flowchart illustrating a procedure of a motion vector mapping and coding mode decision in the video transcoder.

FIG. 6 is a flowchart illustrating a procedure of the motion vector mapping and coding mode decision by the video transcoder.

Since the MPEG-2 decoded picture 5 and MPEG-4 encoder input signal 9 have half the spatial resolution in the vertical and horizontal directions, the following procedure is assumed to be carried out on a 2×2 macroblock basis of MPEG-2, that is, on a single macroblock basis of MPEG-4 (see, FIGS. 3A and 3B)

1) Preliminary Forced Coding Mode Decision

First, the coding mode estimator 8 checks on the coding mode distribution in 2×2 macroblocks of MPEG-2 as shown in FIGS. 3A and 3B.

FIG. 7 is a diagram illustrating the monitoring operation in the MPEG-2 coding mode of the coding mode estimator 8.

As shown in FIG. 7, according to the coding frame instruction information 13, the present embodiment 2 monitors the MPEG-2 coding mode during the frame decimation from the immediately previous target frame of the MPEG-4 coding to the current target frame of the MPEG-4 coding (steps ST12 and ST13). If at least one occasion takes place when all the four macroblocks of MPEG-2 are INTRA mode, the coding mode after the conversion to be used by the MPEG-4 coding is forcedly made INTRA mode.

On the other hand, if all the four macroblocks are the SKIP mode, the coding mode to be used by the MPEG-4 coding is forcedly made SKIP if the SKIP continues during the frame decimation from the immediately previous target frame of the MPEG-4 coding to the current target frame of the MPEG-4 coding. In contrast, if an occasion other than the SKIP takes place even once, the possibility of the INTER mode is checked. The monitoring of the MPEG-2 coding mode during the frame decimation is carried out for the P frames only, so that I frames undergo the MPEG-4 coding without being subjected to the decimation. Thus, the monitoring of the MPEG-2 coding mode is reset (steps ST14 and ST15). When the coding mode is forcedly placed at INTRA or SKIP, all the motion vectors are set to zero, and the subsequent steps are skipped.

Accordingly, the coding mode setting information 12 output from the coding mode estimating section 8 includes three possible choices of forced INTRA mode, forced SKIP mode, and INTER mode (step ST0).

As a result, only when a decision is made that the possibility of the INTER mode must be checked, the optimum mode in terms of the coding efficiency is redecided among the possible MPEG-4 coding modes according to the following procedure 2) and onward.

2) Selection of Motion Vector Candidates

When a decision is made at the foregoing section 1) that the INTER mode is valuable, the MPEG-2 motion vectors are monitored during the frame decimation from the immediately previous target frame of the MPEG-4 coding to the current target frame of the MPEG-4 coding according to the coding frame instruction information 13 as shown in FIG. 8 (steps ST12 and ST13). Then, the motion vector candidates used by the MPEG-4 encoder 10 are decided from the MPEG-2 motion vectors obtained as a result of the monitoring.

The process is carried out by the motion vector mapping section 7. According to the results of the foregoing section 1), in the present process, a case is considered in which the SKIP mode or INTER mode occurs during the frame decimation as the MPEG-2 coding mode as a rule. Thus, the following rule is applied.

Rule 1: Obtain a motion vector candidate of the target macroblock to be coded by accumulating motion vectors of the macroblocks at the same place in the decimated frames as a result of the frame rate conversion.

$$v_{MPEG4} = \sum_k S(v^k_{MPEG2})$$

where $v_{MPEG4}$ is a motion vector candidate of the target MPEG-4 macroblock to be coded, k is a counter of the frames to be decimated as a result of the frame rate conversion, S(*) is a scaling of the motion vectors in accordance with the resolution, and $v^k_{MPEG2}$ represents the MPEG-2 motion vector corresponding to the target MPEG-4 macroblock to be coded. Here, the $v_{MPEG4}$ includes two types of INTER and INTER4V. Thus, the motion vector candidates of INTER4V are obtained, first, and then the motion vector candidate of INTER is obtained as described in the section 2-2) of the foregoing embodiment 1 (steps ST1 and ST2)

Rule 2: Carry out scaling of $S(v^k_{MPEG2})$ in accordance with the rule of the section 2-1) of the foregoing embodiment 1, considering the difference in the frame/field vectors involved in the interlace coding.

Rule 3: Set the motion vector $v^k_{MPEG2}$ to be accumulated at zero when the SKIP mode occurs at a certain value of the frame counter k.

Rule 4: Reset monitoring of the MPEG-2 motion vectors and the accumulation of the motion vectors in the I frames (steps ST14 and ST15).

3) Coding Mode Decision

In the foregoing section 2), the motion vector candidates to be used in the MPEG-4 INTER and INTER4V modes have been selected. Then, from among these modes and the remaining possible coding modes, INTRA mode and SKIP mode, the mode with the highest coding efficiency is selected (steps ST3-ST11). As a result, the final coding mode and motion vectors are decided. The processing is carried out by the coding parameter deciding section 10B. The processing by the coding parameter deciding section 10B from now on is in conformity with the section 3) of the foregoing embodiment 1. In this case, however, the reference picture the motion prediction uses is a local decoded picture of the MPEG-4 coded frame immediately previous to the current target frame to be coded.

With the foregoing procedure, the present embodiment 2 can select the optimum mode and the motion vectors associated with it from among all the possible coding modes in the MPEG-4 coding even in the transcoding that carries out temporal resolution (frame rate conversion) involving the P frame decimation.

In particular, the present embodiment 2 simplifies the motion vector detection with a large computational load even in the transcoder that carries out the P frame decimation. Accordingly, it can improve the quality of the video transcoding from MPEG-2 to MPEG-4 as compared with the conventional simple motion vector reusing method.

Although the foregoing description is made by way of example using the MPEG-4 simple profile, the transcoder with the present configuration is also applicable to all the MPEG-4 simple profile compliant multi-mode coding schemes such as the MPEG-4 advanced simple profile and a case supporting the motion prediction option described in Annex F of ITU-T H.263. The present invention is applicable to transcoding in general targeted for MC+DCT video coding schemes.

INDUSTRIAL APPLICABILITY

As described above, the video data converter and video data converting method in accordance with the present invention are applicable to those requiring improvement in transcode video quality by a small amount of computation, when carrying out a variety of conversions of video compression data in conformity with various video compression-decompression schemes based on international standards.

What is claimed is:

1. A video data converter for converting input video coded data based on a first video coding scheme to video coded data based on a second video coding scheme, said first video coding scheme carrying out coding by dividing each frame of a video signal into specified segments and by selecting coding parameters including a motion vector for each specified segment, and said second video coding scheme carrying out coding by dividing each frame of the video signal into specified segments and by selecting coding parameters for each specified segment, said video data converter comprising:

a decoder for decoding from the input video coded data a video signal coded according to the first video coding scheme;

a motion vector mapping section for generating a plurality of motion vector candidates for each specified segment of a frame of the decoded video signal to be coded according to the second video coding scheme, the plurality of motion vector candidates being generated from the motion vector in the coding parameters of each specified segment of the corresponding frame of the video signal coded according to the first video coding scheme; and a coding parameter deciding section for selecting for each of the specified segments a motion vector to be used in the second video coding scheme from among the generated motion vector candidates, the motion vector being selected according to a prediction error estimation value that estimates a prediction efficiency when using each of the motion vector candidates and according to a motion vector rate estimation value that estimates a motion vector rate when using each of the motion vector candidates.

2. The video data converter according to claim 1, wherein said motion vector mapping section generates one of the motion vector candidates for each of a number of types of motion prediction modes that are possessed by the second video coding scheme.

3. The video data converter according to claim 1, further comprising:

a coding mode estimator for estimating a coding mode for each of the specified segments in the second video coding scheme according to a coding mode in the coding parameters of each of the specified segments in the first video coding scheme, wherein said coding parameter deciding section makes a decision as to which coding mode is to be used in the second video coding scheme to code the specified segments by selecting, based on the estimated coding modes, one of the following two methods for deciding the coding mode:

deciding that the coding mode to be used in each of the specified segments in the second video coding scheme is the coding mode estimated by said coding mode estimator, and deciding the coding mode to be used in each of the specified segments in the second video coding scheme by choosing one of a plurality of coding modes according to the prediction error estimation value and the motion vector rate estimation value.

4. The video data converter according to claim 1, further comprising a spatial resolution converter for down-converting spatial resolution of the video data coded in accordance with the first video coding scheme to half resolution in both horizontal and vertical directions.

5. The video data converter according to claim 1, further comprising a temporal resolution converter for implementing temporal resolution of the video data coded in accordance with the first video coding scheme by decimating a frame not used for inter-frame motion prediction.

6. The video data converter according to claim 3, further comprising:

a temporal resolution converter for implementing temporal resolution of video data coded in accordance with the first video coding scheme by decimating a frame used for inter-frame motion prediction, wherein said motion vector mapping section generates the motion vector candidate to be used by the second video coding scheme in coding the decimated frame by using the motion vector in the coding parameters of the frame of the video signal coded according to the first video coding scheme which corresponds to the decimated frame.

7. The video data converter according to claim 1, wherein said first video coding scheme is an MPEG-2 video coding scheme specified in ISO/IEC 13818-2, and said second video coding scheme is an MPEG-4 video coding scheme specified in ISO/IEC 14496-2.

8. A video data converting method of converting input video coded data based on a first video coding scheme to video coded data based on a second video coding scheme, said first video coding scheme carrying out coding by dividing each frame of a video signal into specified segments and by selecting part of coding parameters for each specified segment, and said second video coding scheme carrying out coding by dividing each frame of the video signal into specified segments and by selecting part of coding parameters for each specified segment, said video data converting method comprising the steps of:

decoding from the input video coded data a video signal coded according to the first video coding scheme;

generating a plurality of motion vector candidates for each specified segment of a frame of the decoded video signal to be coded according to the second video coding scheme, the plurality of motion vector candidates being generated from a motion vector in the coding parameters of each specified segment of the first video coding scheme; and selecting for each of the specified segments a motion vector to be used in the second video coding scheme from among the generated motion vector candidates, the motion vector being selected according to at least one of: a prediction error estimation value that estimates a prediction efficiency when using each of the motion vector candidates, and a motion vector rate estimation value that estimates a motion vector rate when using each of the motion vector candidates.

9. The video data converter according to claim 3, wherein when the estimated coding modes for each of the specified segments is INTRA mode, the coding parameter deciding section decides that the coding mode to be used in each of the specified segments in the second video coding scheme is INTRA mode, when the estimated coding modes for each of the specified segments is SKIP mode, the coding parameter deciding section decides that the coding mode to be used in each of the specified segments in the second video coding scheme is SKIP mode, and when the estimated coding mode for at least one of the specified segments is INTER mode, the coding parameter deciding section chooses the coding mode to be used in the at least one of the specified segments in the second video coding scheme as the one of the plurality of coding modes in the second video coding scheme maximizing a coding efficiency based on the prediction error estimation value and the motion vector rate estimation value.

10. The video data converter according to claim 3, wherein for each of the specified segments, the coding parameter deciding section selects the one of the generated motion vector candidates corresponding to the coding mode decided to be used in that specified segment in the second video coding scheme.

11. The video data converting method according to claim 8, wherein said generating step generates one of the motion vector candidates for each of a plurality of types of motion prediction modes that are possessed by the second video coding scheme.

12. The video data converting method according to claim 8, further comprising:

estimating a coding mode for each of the specified segments in the second video coding scheme according to a coding mode in the coding parameters of each of the specified segments in the first video coding scheme, making a decision as to which coding mode is to be used in the second video coding scheme to code the specified segments by selecting, based on the estimated coding modes, one of the following two methods for deciding the coding mode:

deciding that the coding mode to be used in each of the specified segments in the second video coding scheme is the coding mode estimated by said coding mode estimator, and deciding the coding mode to be used in each of the specified segments in the second video coding scheme by choosing one of a plurality of coding modes according to the prediction error estimation value and the motion vector rate estimation value.

13. The video data converting method according to claim 8, further comprising down-converting spatial resolution of the video data coded in accordance with the first video coding scheme to half resolution in both horizontal, and vertical directions.

14. The video data converting method according to claim 1, further comprising implementing temporal resolution of the video data coded in accordance with the first video coding scheme by decimating a frame not used for inter-frame motion prediction.

15. The video data converting method according to claim 12, further comprising:

implementing temporal resolution of video data coded in accordance with the first video coding scheme by decimating a frame used for inter-frame motion prediction, wherein the motion vector candidate to be used by the second video coding scheme in coding the decimated frame is generated by using the motion vector in the coding parameters of the frame of the video signal coded according to the first video coding scheme which corresponds to the decimated frame.

16. The video data converting method according to claim 8, wherein said first video coding scheme is an MPEG-2 video coding scheme specified in ISO/IEC 13818-2, and said second video coding scheme is an MPEG-4 video coding scheme specified in ISO/IEC 14496-2.

17. The video data converting method according to claim 12, wherein the decision is made as to which coding mode is to be used in the second video coding scheme to code the specified segments according to the following:

when the estimated coding modes for each of the specified segments is INTRA mode, the coding parameter deciding section decides that the coding mode to be used in each of the specified segments in the second video coding scheme is INTRA mode, when the estimated coding modes for each of the specified segments is SKIP mode, the coding parameter deciding section decides that the coding mode to be used in each of the specified segments in the second video coding scheme is SKIP mode, and when the estimated coding mode for at least one of the specified segments is INTER mode, the coding parameter deciding section chooses the coding mode to be used in the at least one of the specified segments in the second video coding scheme as the one of the plurality of coding modes in the second video coding scheme maximizing a coding efficiency based on the prediction error estimation value and the motion vector rate estimation value.

18. The video data converter according to claim 12, wherein for each of the specified segments, the coding parameter deciding section selects the one of the generated motion vector candidates corresponding to the coding mode decided to be used in that specified segment in the second video coding scheme.

* * * * *